United States Patent [19]
Schwarzbich

[11] Patent Number: 5,593,210
[45] Date of Patent: Jan. 14, 1997

[54] ADJUSTING MECHANISM FOR A VEHICLE SEAT BACK

[76] Inventor: Jörg Schwarzbich, Wertherstrasse 15, D-33615 Bielefeld, Germany

[21] Appl. No.: 448,986

[22] Filed: May 24, 1995

[30] Foreign Application Priority Data

May 24, 1994 [DE] Germany .................. 9408426 U

[51] Int. Cl.$^6$ .................................................. B60N 2/02
[52] U.S. Cl. ..................... 297/361.1; 297/374; 192/8 R
[58] Field of Search ............................. 297/374, 361.1, 297/354.12, 463.1; 192/8 R, 7, 44

[56] References Cited

U.S. PATENT DOCUMENTS

| | | |
|---|---|---|
| 1,288,327 | 12/1918 | Westrich . |
| 2,104,320 | 1/1938 | Fischer . |
| 3,084,774 | 4/1963 | Liang . |
| 3,243,023 | 3/1966 | Boyden .................. 192/8 R |
| 4,260,045 | 4/1981 | Hack . |
| 4,584,857 | 4/1986 | Weber . |
| 5,248,017 | 9/1993 | Schwarzbich .............. 192/8 R |
| 5,460,253 | 10/1995 | Ritter et al. ............. 297/374 X |
| 5,522,488 | 6/1996 | Schwarzbich .............. 192/8 R |

FOREIGN PATENT DOCUMENTS

| | | |
|---|---|---|
| 0370502 | 11/1989 | European Pat. Off. . |
| 616959 | 8/1935 | Germany . |
| 1798512 | 10/1958 | Germany . |
| 1138291 | 10/1962 | Germany . |
| 4129617 | 9/1992 | Germany . |
| 4134353 | 9/1992 | Germany . |
| 1011446 | 12/1965 | United Kingdom . |

*Primary Examiner*—Milton Nelson, Jr.
*Attorney, Agent, or Firm*—Burns, Doane, Swecker & Mathis, L.L.P.

[57] ABSTRACT

An adjusting mechanism for a vehicle seat back includes a shaft rotatable when the seat back is being adjusted, and a brake for selectively preventing or permitting such rotation. The brake has a shaft-locking position for locking the shaft against rotation, and a shaft-releasing position enabling the shaft to rotate in either direction, whereby the seat back can be adjusted in either direction. The brake is actuated by a manual actuator comprised of two slotted members which have respective slots that are superimposed one over the other and are overlapped at an oblique angle. A pin extends through both slots and is movable in two directions, i.e., for locking or unlocking the shaft. In each direction of pin movement the slotted members rotate in opposite directions to either actuate or release the brake. The slotted members can comprise parallel plates or telescoped tubes.

11 Claims, 3 Drawing Sheets

ADJUSTING MECHANISM FOR A VEHICLE SEAT BACK

BACKGROUND OF THE INVENTION

The invention relates to an adjusting mechanism for a vehicle seat back.

Typically, a vehicle seat back can be adjusted by being tilted forwardly or rearwardly and is held in selected positions of adjustment by a brake mechanism. The brake mechanism can be released by manual rotation of a brake-release hand wheel (or by a hand lever). The hand wheel is rotatable selectively in clockwise and counter clockwise directions. When the hand wheel is rotated in the clockwise direction, the seat back can be adjusted in a first direction but remains braked against adjustment in the second (opposite) direction. When the hand wheel is rotated in the counter clockwise direction, the seat back can be adjusted in the second direction but is braked against adjustment in the first direction. There is no position of the hand wheel which provides the user with the option of adjusting the seat back in either the first direction or second direction.

The brake mechanism acts upon a shaft which is operably connected to the seat back such that when the shaft is braked, the seat back cannot be adjusted; when the shaft is free-running, the seat back can be adjusted.

In particular, and as disclosed in EP 0 370 502, free-running brakes operate in such a way, for example, that they fix an adjustment hub in a median position and have a hand wheel for releasing the adjustment hub for free rotation in either of two opposing directions. The braking part comprises two braking areas positioned about the same axis which can be swivelled relative to each other by a given swivelling angle, whereby the one area includes two spring elements which press two roller bodies into the locked position between clamping surfaces of the braking area and the opposite circular cylindrical surface of the housing, and the second brake area has a pressure surface lying in the median position at a small distance from the roller bodies which release a clamping body from the clamped position when turned in either of the two directions.

Furthermore, a brake is disclosed in German Document 91 01 110-U1 for the transmission of a rotational movement in both rotational directions, whereby the brake is provided with a free-running hub and a catch of the kind that enables the brake to be freely rotated in both rotational directions by the force from the driving gear to the main drive pinion and locks with the reversal of the force. This is useful for seats with free-running which work in both rotational directions. The brake comprises a pair of clamping bodies which are pressed into their locked position on a wedge surface by springy elastic elements and pushed out of their locked position by an actuator when an actuator is displaced. The actuator is a drive wheel which preferably meshes eccentrically with an inner toothing on the part to be adjusted, with a high gear ratio, and the driving gear as well as the main drive wheel are positioned or sit on a common hub. The clamping body of the free-running hub on one hand runs on a frame-mounted hub and the slated surfaces for clamping the clamping bodies of the free-running hub are formed on the inner surface of a ring surrounding the hub, which is connected with the surrounding main pinion wheel and provided with projections. The projections engage in the openings on the driving wheel for displacing the clamping bodies from their clamped position. In this kind of free-running brake or gear for which the configuration revealed above is only an example, the hub can be made free running in one direction or the other, depending upon the manner of actuation of the actuator, but the actuator cannot enable the hub to be free-running in both directions. That is, there is no position of the hand wheel in which the seat back can be selectively adjusted in either of two directions.

The invention has the task of creating an adjusting mechanism for a vehicle seat back in which a brake can be locked in both directions, or released in both directions by means of a simplified mechanism which possesses advantageous properties of free-running brakes known to this point.

The invention also has an object to provide an effective actuator for releasing the brake.

SUMMARY OF THE INVENTION

The present invention relates to an adjustment mechanism for an adjustable seat back of a vehicle seat structure. The mechanism comprises a rotary shaft connected to the seat back for rotation during adjustment of the seat back, and a brake mechanism for selectively inhibiting and permitting rotation of the shaft to correspondingly inhibit and permit adjustment of the seat back. The brake mechanism includes a plurality of circumferentially spaced wedge structures positioned around the shaft. Each wedge structure includes a pair of circumferentially spaced wedge surfaces spaced radially outwardly from the shaft. A plurality of circumferentially spaced clamping structures is arranged in a space formed between the shaft and respective ones of the wedge structures. Each clamping structure includes a pair of clamping bodies located in the space adjacent respective ones of the wedge surfaces, and an elastic member disposed circumferentially between the pair of clamping bodies for biasing the pair of clamping bodies toward their respective wedge surfaces to be urged into clamping engagement with the shaft for braking the shaft against rotation in both directions of rotation and thereby prevent adjustment of the seat back. The brake mechanism further includes an actuating mechanism for displacing the clamping bodies toward their respective elastic members and out of clamping engagement with the shaft. The actuating mechanism includes a plurality of claws each disposed circumferentially between two of the clamping structures. Each claw includes first and second parts movable circumferentially movable to one another. The first claw part is arranged bear against a clamping body of one of the two clamping structures, and the second claw part being arranged to bear against a clamping body of the other of the two clamping structures. The actuating mechanism further includes first and second slotted members, the first slotted member being fixed to the first claw parts, and the second slotted member being fixed to the second claw parts. The first and second slotted members are arranged to rotate about a common axis of rotation coinciding with a longitudinal axis of the shaft. Each of the slot members includes a slot, the slots being superimposed over one another in overlapping relationship and arranged at an oblique angle to one another. The actuating member further includes a pin extending through both of the first and second slots. The pin is movable within the slots in a first direction for rotating the first and second slotted members opposite one another to displace the claw part toward respective clamping bodies and thereby push the clamping bodies into non-clamping relationship with the shaft, and in a second direction for rotating the first and second slotted members opposite one another to displace the claw parts away from the respective clamping bodies to enable the elastic members to push the clamping bodies into clamping relationship with the shaft.

With a free-running brake built in this way, it is possible to increase the braking effect in both rotational directions at the same time so that a rotational movement in both directions is possible without being hindered. The seat backs can be adjusted practically in this way both directions to a desired angled position against the effect of a recovery spring, by the driver adjusting the most comfortable or desired angle position by changing the attitude of his/her seat correspondingly. The seat back pressed by the recovery spring assumes this angled position and is locked into this angled position after readjustment of the catch. In this way, the usual operation of the claws to this point for releasing the free-running hub or shaft is maintained in that both claws are pushed together as before in one direction, to release the corresponding locked position for turning in a direction.

A free-running brake in accordance with the invention is built very simply and compactly. This new function of the complete release in both rotational directions can be achieved without a significant change in the basic construction, only by the division of the claws and the operating elements connected with this.

According to an embodiment of the invention this is characterized by that the operating elements on the two parts of the claws are in the form of radially extending levers lying over one another, which on their outer ends have longitudinal holes which lie at a sharp angle to one another, in which a cot or pin engages, which is arranged on the end of an operational lever.

According to another embodiment, the operating elements on the two parts of the claws are telescoping tubes which have longitudinal holes on their perimeter lying at sharp angles of one another, in which a cog engages, which is arranged on the end of the operating lever.

Both of these different embodiments have a very compact construction, whereby the first embodiment makes a very flat construction possible and the second embodiment makes a very deep construction possible without additional room required in the radial direction.

Between both of the operating elements for both parts of the claws, a spring can also be arranged, which works as a pressure or tension spring and supports or counteracts the spreading movement of both operating elements.

In this way it can be achieved that the free-running brake is situated continually in the locked mode in both rotational directions and can be released by special operation by pressing the pressure spring together, so that they allow the rotation in both directions at the same time. In the other arrangement, with the insertion of a tension spring, it can be achieved that the free-running brake is continually released in both rotational directions and a concurrent locking of the free-running hub in both rotational directions results only through a corresponding operation which spreads the operating element against the effect of the tension spring and with it, pushed both claw parts apart.

The operating lever, which causes the shift in angle of both of the operating elements on both of the parts of the claws can be provided with a latching and/or unlatching catch.

In this way it is made possible that a continuing locking or continuing release of the free-running brake can be adjusted in both directions when it is desired.

The radial division of the claws is practical in this invention with an axial displacement so that the claw parts have a common gliding and guidance surface for the rotating or shifting movement toward each other.

The functional capability and security is significantly improved through the above measures, because through these the guidance of both of the claw parts toward each other with its shifting movement is significantly improved and is more certainly accomplished. Projections and grooves corresponding to one another and engaging in one another, running in the direction of the shifting of the claw parts, can also be designed for the same purpose on the gliding surfaces lying on one another.

BRIEF DESCRIPTION OF THE DRAWINGS

The objects and advantages of the invention will become apparent from the following detailed description of preferred embodiments thereof in connection with the accompanying drawings, in which like numerals designate like elements, and in which.

DETAILED DESCRIPTION OF PREFERRED EMBODIMENTS OF THE INVENTION

Figure 5:
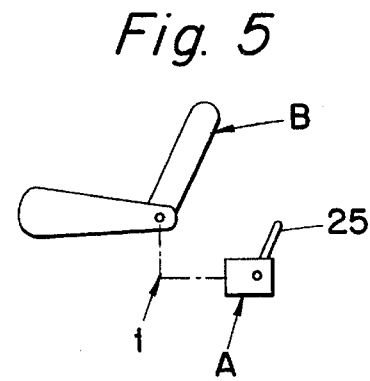
FIG. 5 is a schematic showing of the adjusting mechanism connected to a vehicle seat back.

A shaft 1 includes cogs 3 and 4 positioned rotatably in respective frame parts 2 of a brake mechanism A. The shaft is fixed to a gear 5 which is operatively connected to a vehicle seat back B (see FIG. 5) so as to be rotated when the seat back is adjusted. Braking of the shaft 1 prevents the seat back from being adjusted. The shaft 1 is surrounded or overlapped by a stepped tube 6, and this tube 6 includes a reduced diameter portion positioned rotatably on the shaft. A large diameter portion 8 of the tube 6 surrounds a large diameter portion of the shaft, with a radial space formed therebetween. Clamping bodies 9 in the form of rollers are positioned in this space between the tube 6 and the shaft 1. These clamping bodies 9 are combined in pairs 9A, 9B which work in cooperation with slanted wedge surfaces 10 formed on the inside surface of the large diameter portion 8 of the tube. The wedge surfaces 10 cooperate with the opposing surfaces of the shaft 1 to form a wedge area for the clamping bodies (rollers) 9 for shifting the rollers toward the shaft 1. There are several pairs of rollers distributed around the periphery of the shaft and consequently several associated wedge surfaces 10 are arranged around the periphery of the enlarged diameter portion 8 of the tube 6. The tube 6 is attached to a frame part 11 by means of radial deformations 16.

Between each pair of rollers 9 a springy, elastic body 12 is situated, which pushes the clamping bodies 9 apart.

Between respective pairs of rollers 9, claws 13 are arranged which circumferentially occupy the space between the tube area 8 and the shaft 1 and bear against the outer peripheries of respective rollers 9. These claws 13 pass through respective slots 15 formed in a radially extending area 17 between the portions 8 and 7 of the tube 6. The claws 13 are connected to ring-shaped bodies 20, 21 as will be explained, which bear against the radial area 17 of the tube 6 and surround the narrowed area 7 of the tube. The bodies 20, 21 are rotatable relative to the tube 6 about the axis of the shaft 1, the extent of relative rotatability being defined by a small amount of circumferential play between the claws 13 and their respective slots 15.

Figure 3:
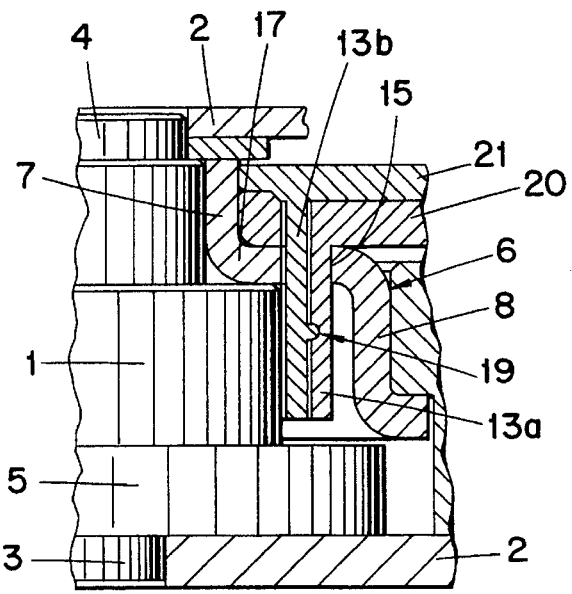
FIG. 3 is a section along line 3—3 in FIG. 1.

Each of the claws 13 comprises two parts 13a and 13b. Those parts are circumferentially overlapping so that the claw parts 13a and 13b can be moved related to one another and have an axial gliding and guidance interface 18. Thus, the claw parts 13a and 13b are able to abut one another at shoulders 19a and 19b, which are circumferentially and radially offset from one another. These shoulders 19a and 19b can be arranged on a slant relative to a radial plane which passes through the rotational axis of the shaft 1. The parts 13a, 13b engage one another along surfaces 18 which may form a projection/groove connection 19 (see FIG. 3) extending in a direction of rotation to improve and ensure the guidance of both of these claw parts.

Both claw parts 13a and 13b pass through the slot 15 and are connected separately with respective operating elements in the form of radially extending levers 20 and 21, which are axially superimposed. These levers 20 and 21 can be shifted in relatively opposite directions, whereupon they shift the claw parts 13a, 13b to either lock or release the shaft 1.

If the levers 20 and 21 are shifted relative to one another to move the claw parts 13a and 13b circumferentially away from one another, all of the clamping bodies 9 are pushed out of their wedged (locked) position against the bias of the elastic bodies 12, so that the shaft is thus released for free rotation in both rotational directions. If the levers 20, 21 are shifted relative to one another to move the claw parts 13a and 13b toward one another, the elastic bodies 12 bias the clamping bodies to their shaft-locking positions.

Figure 1:
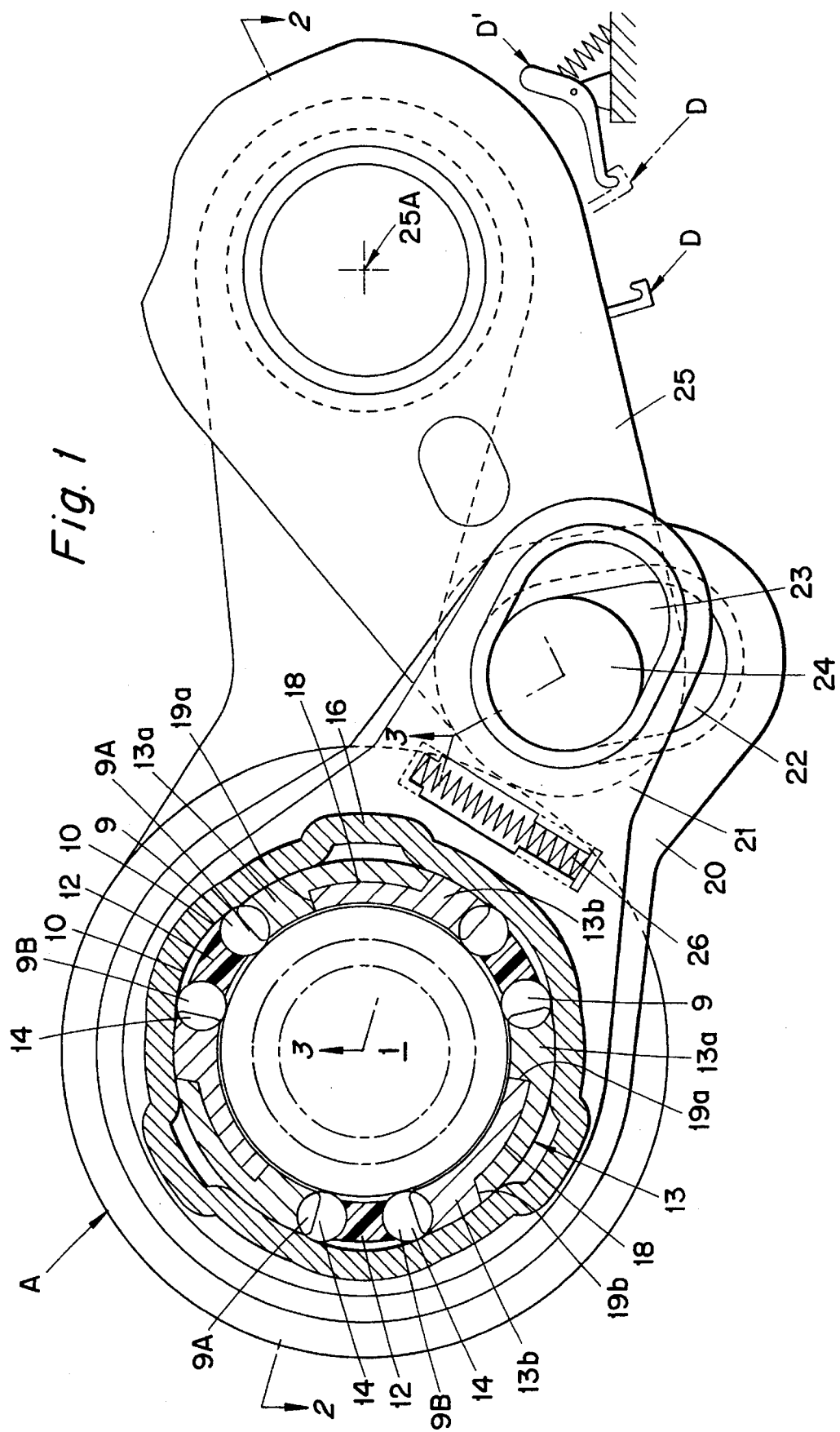
FIG. 1 is a top view, partially cut, of the free-running brake according to the invention.
Figure 2:
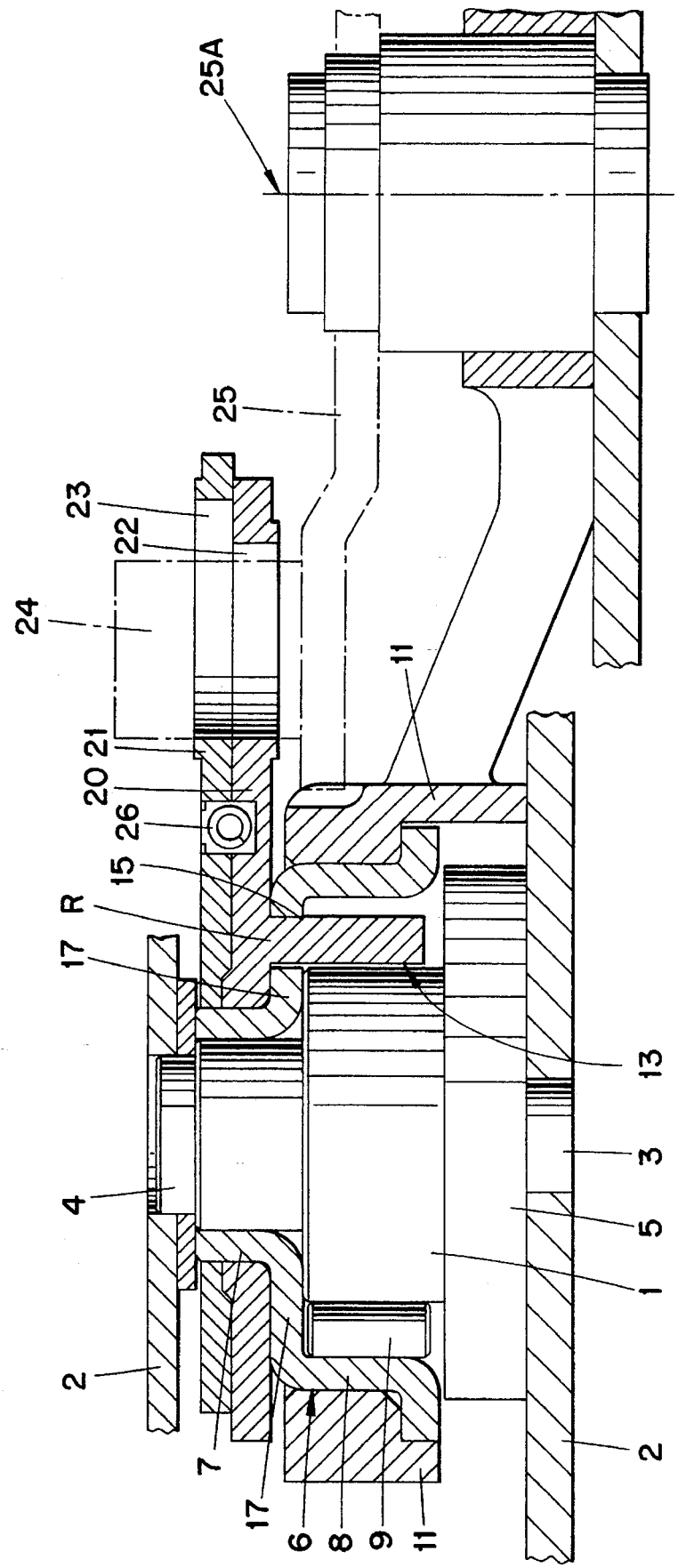
FIG. 2 is a section along line 2—2.

To enable the levers 20 and 21 to be shifted (rotated) relative to one another, longitudinal slots 22 and 23 are arranged on the ends of the respective levers, which slots extend at a sharp angle to one another. A cog or pin 24 engages in these longitudinal slots, which pin is fixed to an additional outside lever 25. It should be particularly noted in FIGS. 1 and 2 that when turning the lever 25 counterclockwise about an axis 25A and with it, the pin 24, the pin is displaced counterclockwise in the longitudinal slots 22 and 23 and thus rotates the levers 20 and 21 relative to one another, so that the claw parts 13a and 13b are circumferentially spread apart, whereupon the brake is released. In response to a reverse clockwise turning of the lever 25 and the pin 24, the claw parts 13a and 13b are rotated toward one another and a complete locking of the rotational movement of the shaft is produced once again.

The lever 25, which could alternately comprise a knob or hand wheel, is preferably provided with a catch D which is engageable with a manually actuable hook D' to hold the lever in a desired position, for instance with the clamping elements in a non-clamping relationship with the shaft 1. The shaft 1 would thus be free to move in both directions and can be put into the desired position and then braked by releasing the catch D. This is particularly advantageous for instance in cases where the seat back is provided with a recovery spring (not shown). After releasing the free-running brake, the seat back can be put in the desired position by being freely tilted in either direction against the bias of the recovery spring in order to be fixed in this position by a corresponding operation of the lever 25.

Between both levers 20 and 21, which are connected with respective claw parts 13a and 13b, a spring 26 can be arranged, which is designed as either a compression spring or a tension spring, i.e., the spring can be arranged to either assist or oppose the operation of the lever 25. The spring 26 can be installed so that it works as a primary operation for the spreading or contracting of the claw parts 13a and 13b, and only a particular additional operating element is installed, as for example the pin 24 on the lever 25 in cooperation with the longitudinal slots 22 and 23 against the continual effect of the spring 26 in order to cause a spreading or contraction of the claw parts 13a and 13b.

Figure 4:
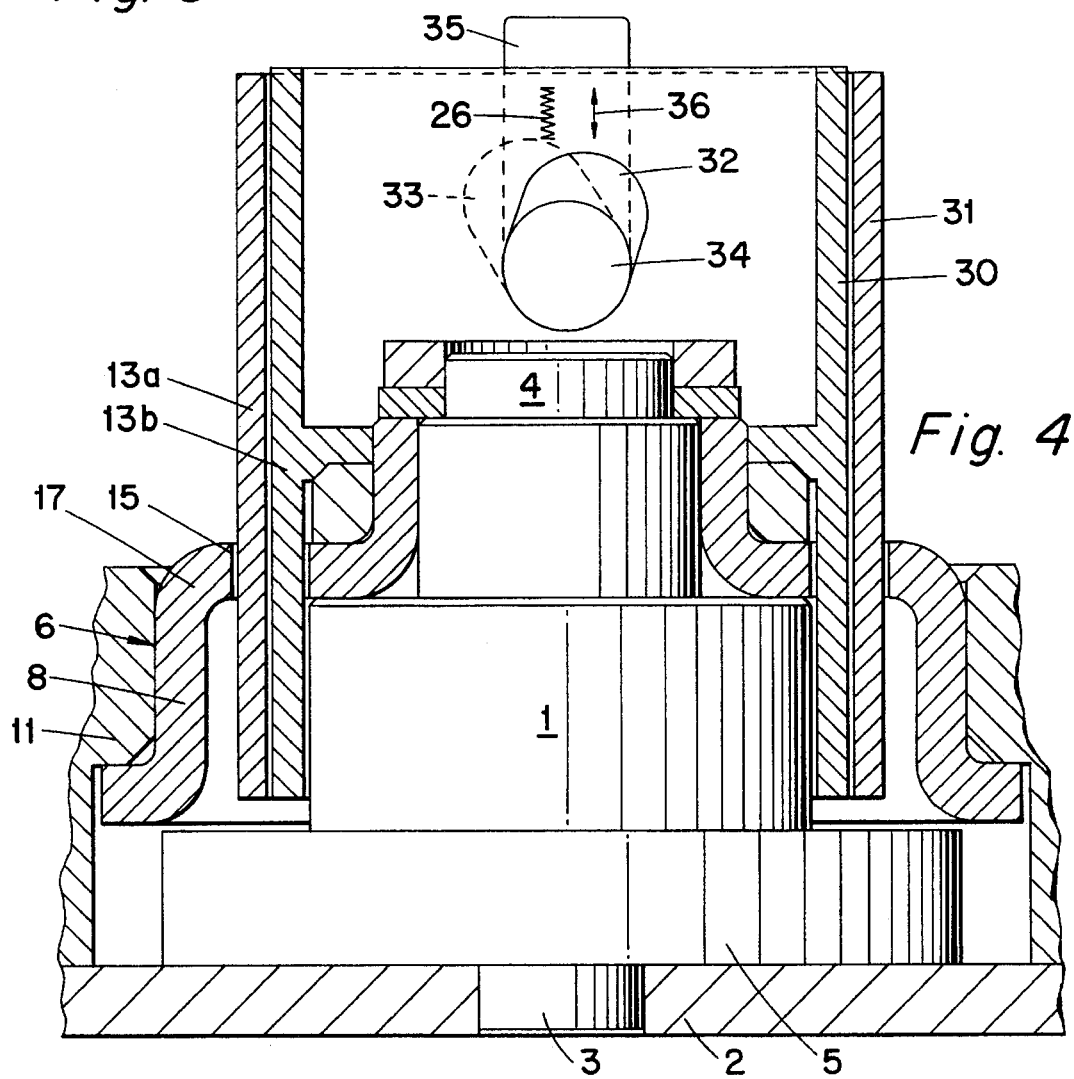
FIG. 4 is an axial section through another embodiment of the invention.

The exemplary embodiment described above has the advantage that it is built in the axial direction of the shaft 1 in an especially compact and space saving manner. In case it is instead desired to build the brake as compactly as possible in the radial direction and to take up little space, the construction according to the embodiment in FIG. 4 is used, whereby the same elements are provided with the same reference numbers. In this exemplary embodiment, the operating elements for the claw parts 13a comprise tubes 30 and 31 which are coaxial with the shaft 1. Longitudinal slots 32 and 33 are in turn arranged at a sharp angle to one another in these tubes 30 and 31, in which a pin 34 engages. This pin 34 is connected with a member 35, which is positioned shiftably on the frame in the direction of the double arrow 36, i.e., parallel to the axis of the shaft 1. By means of this member 35, the same effect can manually be produced as was already described in connection with the lever 25 for locking or releasing the free-running brake, i.e., spreading or contracting the claw parts 13a and 13b. A spring 26 can also be arranged here between the two coaxial tubes 30 and 31, which likewise is designed as a pressure spring or tension spring and works in a similar way to the one already described in connection with the exemplary embodiment above.

The member 35 can also be provided with a catch which continually holds it in one position, preferably in the locked position of the claw parts and can only be operated correspondingly with a push button, against the effect of the recovery spring, in order to release the lock, so that both claw parts are spread against each other and the free-running hub is released in both directions.

It is notable that the operating element in the form of the lever 25 in the first exemplary embodiment and the member 35 in the second exemplary embodiment are also interchangeable with one another.

It is further notable that the invention is not limited to the individually described exemplary embodiments described here. Thus the slanted surfaces 10 effected from the wedge surfaces, for example, can also be designed on the shaft, as is known in the prior art.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An adjustment mechanism for an adjustable seat back of a vehicle seat structure, comprising:

a rotary shaft adapted to be connected to an adjustable seat back for rotation during adjustment of said seat back; and a brake mechanism for selectively inhibiting and permitting rotation of said shaft to correspondingly inhibit and permit adjustment of said seat back, said brake mechanism including:

a plurality of circumferentially spaced wedge structures positioned around said shaft, each wedge structure including a pair of circumferentially spaced wedge surfaces spaced radially outwardly from said shaft, a plurality of circumferentially spaced clamping structures arranged in a space formed between said shaft and respective ones of said wedge structures, each clamping structure including:

a pair of clamping bodies located in said space adjacent respective ones of said wedge surfaces, and an elastic member disposed circumferentially between said pair of clamping bodies for biasing said pair of clamping bodies toward their respective wedge surfaces to be urged into clamping engagement with said shaft for braking said shaft against rotation in both direction of rotations and thereby prevent adjustment of said seat back; and an actuating mechanism for displacing said clamping bodies toward their respective elastic members and out of said clamping engagement with said shaft, said actuating mechanism including:

a plurality of claws each disposed circumferentially between two of said clamping structures, each claw including first and second parts movable circumferentially relative to one another, said first claw part arranged to bear against a clamping body of one of said two clamping structures, and said second claw part arranged to bear against a clamping body of the other of said two clamping structures;

first and second slotted members, said first slotted member fixed to said first claw parts, said second slotted member fixed to said second claw parts, said first and second slotted members arranged to rotate about a common axis of rotation coinciding with a longitudinal axis of said shaft, each of said slotted members including a slot, said slots being superimposed over one another in overlapping relationship and arranged at an oblique angle to one another; and a pin extending through both of said first and second slots, said pin being movable within said slots in a first direction for rotating said first and second slotted members opposite one another to displace said claw parts toward respective clamping bodies and thereby push said clamping bodies into non-clamping relationship with said shaft, and in a second direction for rotating said first and second slotted members opposite one another to displace said claw parts away from said respective clamping bodies to enable said elastic members to push said clamping bodies into clamping relationship with said shaft.

2. The adjustment mechanism according to claim 1, wherein said actuating mechanism further includes an operating member carrying said pin and moving said pin in said first and second directions, said operating member rotatable about an operating axis arranged parallel to said longitudinal axis of said shaft, said operating member carrying said pin for moving said pin in said first and second directions about said operating axis, said oblique angle formed by said slots being visible in a direction parallel to said longitudinal axis of said shaft.

3. The adjustment mechanism according to claim 1, wherein said first and second slotted members comprise first and second telescoped tubes, said oblique angle formed by said slots being visible in a direction perpendicular to said longitudinal axis of said shaft, said pin being movable in a direction parallel to said longitudinal axis of said shaft.

4. The adjustment mechanism according to claim 1 including a releasable catch for maintaining said slotted members in a position wherein said clamping bodies are in one of said clamping and non-clamping relationships.

5. The adjustment mechanism according to claim 1 further including a spring for biasing said slotted members to maintain said clamping bodies in one of said clamping and non-clamping relationships.

6. The adjustment mechanism according to claim 5, wherein said spring biases said slotted members for maintaining said clamping bodies in said clamping relationship.

7. The adjustment mechanism according to claim 5, wherein said spring biases said slotted members for maintaining said clamping bodies in said non-clamping relationship.

8. The adjustment mechanism according to claim 1, wherein said first and second claw parts overlap one another in the circumferential direction to provide guide surfaces for one another during circumferential movement of said claw parts.

9. The adjustment mechanism according to claim 8, wherein said guide surfaces form a circumferentially extending guide structure between one another in the form of a projection-and-groove arrangement.

10. An adjustment mechanism in combination with an adjustable seat back of a vehicle seat structure, comprising:

a rotary shaft connected to said seat back for rotation during adjustment of said seat back; and a brake mechanism for selectively inhibiting and permitting rotation of said shaft to correspondingly inhibit and permit adjustment of said seat back, said brake mechanism including:

a plurality of circumferentially spaced wedge structures positioned around said shaft, each wedge structure including a pair of circumferentially spaced wedge surfaces spaced radially outwardly from said shaft, a plurality of circumferentially spaced clamping structures arranged in a space formed between said shaft and respective ones of said wedge structures, each clamping structure including:

a pair of clamping bodies located in said space adjacent respective ones of said wedge surfaces, and an elastic member disposed circumferentially between said pair of clamping bodies for biasing said pair of clamping bodies toward their respective wedge surfaces to be urged into clamping engagement with said shaft for braking said shaft against rotation in both direction of rotations and thereby prevent adjustment of said seat back; and an actuating mechanism for displacing said clamping bodies toward their respective elastic members and out of said clamping engagement with said shaft, said actuating mechanism including:

a plurality of claws each disposed circumferentially between two of said clamping structures, each claw including first and second parts movable circumferentially relative to one another, said first claw part arranged to bear against a clamping body of one of said two clamping structures, and said second claw part arranged to bear against a clamping body of the other of said two clamping structures;

first and second slotted members, said first slotted member fixed to said first claw parts, said second slotted member fixed to said second claw parts, said first and second slotted members arranged to rotate about a common axis of rotation coinciding with a longitudinal axis of said shaft, each of said slotted members including a slot, said slots being superimposed over one another in overlapping relationship and arranged at an oblique angle to one another; and a pin extending through both of said first and second slots, said pin being movable within said slots in a first direction for rotating said first and second slotted members opposite one another to displace said claw parts toward respective clamping bodies and thereby push said clamping bodies into non-clamping relationship with said shaft, and in a second direction for rotating said first and second slotted members opposite one another to displace said claw parts away from said respective clamping bodies to enable said elastic members to push said clamping bodies into clamping relationship with said shaft.

11. An adjustment mechanism in combination with an adjustable member, comprising:

a rotary shaft connected to said adjustable member for rotation during adjustment of said adjustable member; and a brake mechanism for selectively inhibiting and permitting rotation of said shaft to correspondingly inhibit and permit adjustment of said adjustable member, said brake mechanism including:

a plurality of circumferentially spaced wedge structures positioned around said shaft, each wedge structure including a pair of circumferentially spaced wedge surfaces spaced radially outwardly from said shaft, a plurality of circumferentially spaced clamping structures arranged in a space formed between said shaft and respective ones of said wedge structures, each clamping structure including:

a pair of clamping bodies located in said space adjacent respective ones of said wedge surfaces, and an elastic member disposed circumferentially between said pair of clamping bodies for biasing said pair of clamping bodies toward their respective wedge surfaces to be urged into clamping engagement with said shaft for braking said shaft against rotation in both direction of rotations and thereby prevent adjustment of said adjustable member; and an actuating mechanism for displacing said clamping bodies toward their respective elastic members and out of said clamping engagement with said shaft, said actuating mechanism including:

a plurality of claws each disposed circumferentially between two of said clamping structures, each claw including first and second parts movable circumferentially relative to one another, said first claw part arranged to bear against a clamping body of one of said two clamping structures, and said second claw part arranged to bear against a clamping body of the other of said two clamping structures;

first and second slotted members, said first slotted member fixed to said first claw parts, said second slotted member fixed to said second claw parts, said first and second slotted members arranged to rotate about a common axis of rotation coinciding with a longitudinal axis of said shaft, each of said slotted members including a slot, said slots being superimposed over one another in overlapping relationship and arranged at an oblique angle to one another; and a pin extending through both of said first and second slots, said pin being movable within said slots in a first direction for rotating said first and second slotted members opposite one another to displace said claw parts toward respective clamping bodies and thereby push said clamping bodies into non-clamping relationship with said shaft, and in a second direction for rotating said first and second slotted members opposite one another to displace said claw parts away from said respective clamping bodies to enable said elastic members to push said clamping bodies into clamping relationship with said shaft.

* * * * *